March 18, 1947.  B. C. CLARK ET AL  2,417,632

LUNCH BOX

Filed June 12, 1945

Inventors
Belle C. Clark,
Elmer O. Clark.

By McHarris, Berman & Davidson
Attorneys

Patented Mar. 18, 1947

2,417,632

UNITED STATES PATENT OFFICE 2,417,632

LUNCH BOX

Belle C. Clark and Elmer O. Clark, Berea, Ohio

Application June 12, 1945, Serial No. 598,970

3 Claims. (Cl. 206—4)

This invention relates to lunch boxes, and more particularly to a lunch box comprising a plurality of receptacles for food articles.

A main object of the invention is to provide a novel and improved lunch box wherein accessory containers are provided for carrying small food articles and for maintaining them separated from the main contents of the box.

A further object of the invention is to provide an improved lunch box having accessory food containers nested therein so that certain of the accessory food containers form closure means for other accessory food containers when in nested position.

Further objects and advantages of the invention will appear from the following description and claims, and from the accompanying drawings, wherein:

Figure 1:
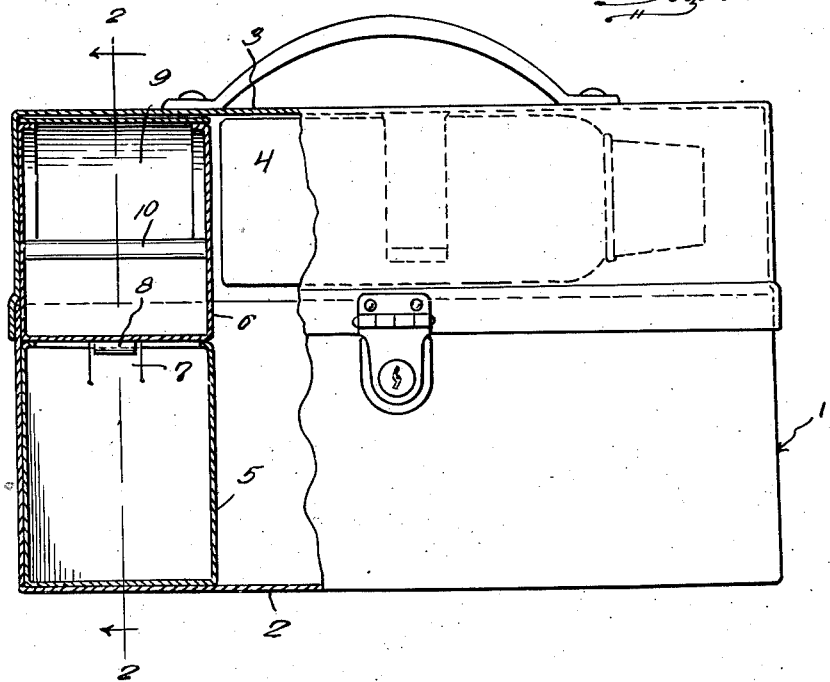
Figure 1 is an elevational view, partly in cross-section, of a lunch box in accordance with this invention.
Figure 2:
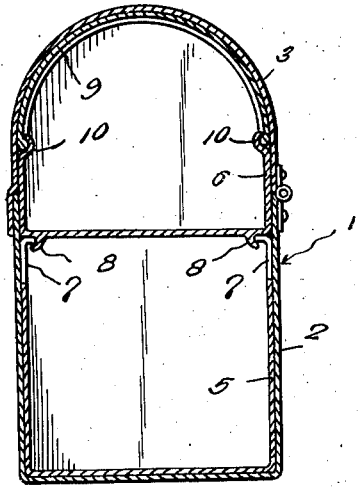
Figure 2 is a cross-sectional view taken on line 2—2 of Figure 1.

Referring to the drawings, 1 designates a lunch box which is conventional in external outline. Lunch box 1 comprises a main receptacle 2 and a rounded cover 3 hinged thereto in the usual manner. The interior of cover 3 provides space for a thermos bottle 4 held in position by spring clips. The interior of main receptacle 2 provides space for food articles such as sandwiches and other relatively bulky items.

Provided at one end of the lunch box are a pair of accessory containers comprising a bottom container 5 which is preferably rigidly secured in position in receptacle 2, and a top container 6, releasably secured to bottom container 5 and forming a top closure therefor. The side walls of container 5 are slit at their top portions to form opposed spring arms 7, 7, the top edges of containers 5 being inwardly flanged. A pair of outwardly and downwardly directed lugs 8, 8 are provided on the bottom wall surface of top container 6, said lugs 8, 8 being adapted to cooperate with the spring arms 7, 7 to resiliently lock top container 6 in closing relation to bottom container 5.

Top container 6 is provided with a spring closure member 9 comprising a semi-circular strip of flat spring metal provided with inwardly biased flanged bottom edges adapted to be received in outwardly facing channel elements 10, 10 formed at the upper edges of the side walls of container 6 for this purpose.

The smaller accessory containers 5 and 6 are adapted to contain small loose food articles such as fruit, candy, cookies and the like, and to maintain them separated from the main contents of the lunch box.

While a specific embodiment of an improved lunch box has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A lunch box comprising a receptacle having a main compartment, a first smaller accessory receptacle provided in said main compartment, said first accessory receptacle having an open top, a second accessory receptacle provided with an open top and positioned over said first accessory receptacle in closure relationship thereto, a flat strip of spring metal on said second receptacle and resiliently secured thereto in closure relationship to said open top thereof, and releasable spring clip means for maintaining said second receptacle in said closure relationship.

2. A lunch box comprising a generally rectangular main receptacle and a rounded cover therefor, a first accessory smaller receptacle provided at one end of said main receptacle, said first accessory receptacle having an open top end, a second accessory receptacle adapted to be positioned over said first accessory receptacle in closure relationship to said open top end, the open top end of said first accessory receptacle being inwardly flanged around its periphery, the top edge portions of the side walls of said first accessory receptacle being slit to form spring arms, the bottom surfaces of said second accessory receptacle having downwardly and outwardly extending lugs adapted to resiliently interlock with said spring arms to thereby provide spring clip means for resiliently securing said second receptacle to said first receptacle in closure relationship, the upper portion of said second receptacle being curved to conform with the internal contour of said rounded cover and having an opening therein, and a closure member for said opening.

3. A lunch box comprising a generally rectangular main receptacle and a rounded cover therefor, a first accessory smaller receptacle provided at one end of said main receptacle, said first accessory receptacle having an open top end, a second accessory receptacle adapted to be positioned over said first accessory receptacle in closure relationship to said open top end, spring clip means for resiliently securing said second receptacle to said first receptacle in said closure relationship, the upper portion of said second receptacle being curved to conform with the internal contour of said rounded cover and having an opening therein, the upper side wall portions of said second receptacle being formed with outwardly facing channel elements, and a closure member for said opening, said closure member comprising a curved strip of spring metal having inwardly flanged lower edge portions adapted to be resiliently received within said channel elements.

BELLE C. CLARK.
ELMER O. CLARK.

REFERENCES CITED

The following references are of record in the file of this patent:

UNITED STATES PATENTS

| Number | Name | Date |
|---|---|---|
| 788,735 | Stephan | May 2, 1905 |
| 825,177 | Bales | July 3, 1906 |